United States Patent
Lee et al.

(10) Patent No.: US 11,912,804 B2
(45) Date of Patent: Feb. 27, 2024

(54) CORE-SHELL COPOLYMER, METHOD FOR PREPARING THE SAME AND THERMOPLASTIC RESIN COMPOSITION INCLUDING THE SAME

(71) Applicant: LG Chem, Ltd., Seoul (KR)

(72) Inventors: Kwang Jin Lee, Daejeon (KR); Yoon Ho Kim, Daejeon (KR); Sang Il Nam, Daejeon (KR); Kyung Bok Sun, Daejeon (KR); Chang No Lee, Daejeon (KR); Sang Hoon Han, Daejeon (KR)

(73) Assignee: LG Chem, Ltd. (KR)

( * ) Notice: Subject to any disclaimer, the term of this patent is extended or adjusted under 35 U.S.C. 154(b) by 881 days.

(21) Appl. No.: 16/966,672

(22) PCT Filed: Oct. 11, 2019

(86) PCT No.: PCT/KR2019/013391
§ 371 (c)(1),
(2) Date: Jul. 31, 2020

(87) PCT Pub. No.: WO2020/101182
PCT Pub. Date: May 22, 2020

(65) Prior Publication Data
US 2021/0032391 A1     Feb. 4, 2021

(30) Foreign Application Priority Data
Nov. 15, 2018 (KR) .......................... 10-2018-0141167

(51) Int. Cl.
| | |
|---|---|
| *C08F 279/02* | (2006.01) |
| *C08F 220/38* | (2006.01) |
| *C08K 5/521* | (2006.01) |
| *C08L 27/24* | (2006.01) |
| *C08F 230/02* | (2006.01) |
| *C08F 220/18* | (2006.01) |
| *C08F 2/44* | (2006.01) |

(52) U.S. Cl.
CPC .............. *C08F 279/02* (2013.01); *C08F 2/44* (2013.01); *C08F 220/38* (2013.01); *C08K 5/521* (2013.01); *C08L 27/24* (2013.01); *C08F 220/18* (2013.01); *C08F 220/382* (2020.02); *C08F 230/02* (2013.01)

(58) Field of Classification Search
CPC .... C08F 279/02; C08F 220/18; C08F 220/38; C08F 220/382; C08F 230/02; C08K 5/521
See application file for complete search history.

(56) References Cited

U.S. PATENT DOCUMENTS

| | | | | |
|---|---|---|---|---|
| 5,186,993 | A | * | 2/1993 | Hallden-Abberton ....................... C08L 25/02 525/902 |
| 5,451,624 | A | * | 9/1995 | Memon ................. C08L 101/00 525/902 |
| 5,686,528 | A | | 11/1997 | Wills et al. |
| 11,795,258 | B2 | * | 10/2023 | Lee ........................ C08F 285/00 |
| 11,820,730 | B2 | * | 11/2023 | Lee ........................... B01J 23/30 |
| 2017/0183455 | A1 | | 6/2017 | Yoo et al. |
| 2019/0062484 | A1 | | 2/2019 | Jang et al. |

FOREIGN PATENT DOCUMENTS

| | | |
|---|---|---|
| KR | 20030040696 A | 5/2003 |
| KR | 20100060173 A | 6/2010 |
| KR | 20120024231 A | 3/2012 |
| KR | 20140099350 A | 8/2014 |
| KR | 20160032668 A | 3/2016 |
| KR | 20160077982 A | 7/2016 |
| KR | 20180086837 A | 8/2018 |
| WO | 2017056466 A1 | 4/2017 |

OTHER PUBLICATIONS

Search report from International Application No. PCT/KR2019/013391, dated Jan. 22, 2020.

* cited by examiner

*Primary Examiner* — Kregg T Brooks
*Assistant Examiner* — David R. Foss
(74) *Attorney, Agent, or Firm* — Lerner David LLP

(57) ABSTRACT

A core-shell copolymer, a method of making the same, and a thermoplastic resin composition including the same are disclosed herein. In some embodiments, a core-shell copolymer includes a core and a shell surrounding the core, the core includes a conjugated diene-based monomer-derived repeating unit and a phosphate-based cross-linking agent-derived cross-linking part represented by Formula 1, and the shell includes a first alkyl (meth)acrylate monomer-derived repeating unit, a second alkyl (meth)acrylate monomer-derived repeating unit, and a sulfonate-based ionic monomer-derived repeating unit represented by Formula 2. The core is 68 parts to 92 parts and the shell is 8 parts to 32 parts, based on 100 parts of the core-shell copolymer, the core has a swell index of 2.7 to 10.9, the shell includes 1 wt % to 16 wt % of the sulfonate-based ionic monomer-derived repeating unit, and the shell has a weight average molecular weight of 105,000 g/mol to 645,000 g/mol.

10 Claims, No Drawings

CORE-SHELL COPOLYMER, METHOD FOR PREPARING THE SAME AND THERMOPLASTIC RESIN COMPOSITION INCLUDING THE SAME

CROSS-REFERENCE TO RELATED APPLICATIONS

The present application is a national phase entry under 35 U.S.C. § 371 of International Application No. PCT/KR2019/013391, filed on Oct. 11, 2019, which claims priority from Korean Patent Application No. 10-2018-0141167, filed on Nov. 15, 2018, the disclosures of which are incorporated herein by reference.

TECHNICAL FIELD

The present invention relates to a core-shell copolymer, and more particularly, to a core-shell copolymer used as an impact modifier of a thermoplastic resin composition, a method for preparing the same, and a thermoplastic resin composition including the same.

BACKGROUND ART

A polyvinyl chloride (PVC) is a general-purpose resin used widely in various fields due to its outstanding physical and chemical properties. However, a polyvinyl chloride has a narrow moldable temperature range because its processing temperature is close to a pyrolysis temperature. In addition, a polyvinyl chloride has a high melting viscosity and a low fluidity, which make it stick to the surface of the processing machine during processing to form carbides, thereby degrading the quality of the final product.

Meanwhile, a polyvinyl chloride has a chlorine content of 56% to 57% and a chlorinated polyvinyl chloride (CPVC) has a chlorine content of 66% to 69%. Thus, the chlorinated polyvinyl chloride, due to its high chlorine content, has an increased mechanical strength and a high heat deflection temperature compared to the polyvinyl chloride.

The chlorinated polyvinyl chloride, however, has advantages of a high tensile strength and a high heat deflection temperature due to the content of chlorine higher than the polyvinyl chloride, but its impact strength and processability are deteriorated.

In order to solve such a problem of deteriorating impact strength, the chlorinated polyvinyl chloride has been used by appropriately selecting additives such as an impact modifier, a processing aid, a stabilizer, and a filler. Among these, a butadiene-based impact modifier, a silicone-based impact modifier, or the like are generally used as an impact modifier for the chlorinated polyvinyl chloride, and in particular, a butadiene-based impact modifier is mainly used.

However, as the content of butadiene-based impact modifiers is increased, the chlorinated polyvinyl chloride has improved impact strength, but has a reduced heat deflection temperature and tensile strength.

Thus, a study for development of impact modifiers having an excellent heat deflection temperature and tensile strength as well as excellent impact strength when applied to the chlorinated polyvinyl chloride, has been continuously demanded.

DISCLOSURE

Technical Problem

An object of the present invention is to improve thermal stability, impact strength and tensile strength of a molded article prepared by containing a core-shell copolymer when applying the core-shell copolymer as an impact modifier for a chlorinated polyvinyl chloride.

That is, an object of the present invention is to provide a core-shell copolymer as an impact modifier that can improve thermal stability, impact strength, and tensile strength of a molded article in the manufacture of the molded article molded from a thermoplastic resin composition including a chlorinated polyvinyl chloride and an impact modifier, a method for preparing the same, and a thermoplastic resin composition including the same.

Technical Solution

In one general aspect, there is provided a core-shell copolymer including a core and a shell surrounding the core, wherein the core includes a conjugated diene-based monomer-derived repeating unit and a phosphate-based cross-linking agent-derived cross-linking part, the phosphate-based cross-linking agent represented by the following Formula 1, the shell includes a first alkyl (meth)acrylate monomer-derived repeating unit, a second alkyl (meth)acrylate monomer-derived repeating unit, and a sulfonate-based ionic monomer-derived repeating unit, the sulfonate-based ionic monomer represented by the following Formula 2, the core is 68 parts by weight to 92 parts by weight and the shell is 8 parts by weight to 32 parts by weight, based on a total of 100 parts by weight of the core-shell copolymer, the core has a swell index of 2.7 to 10.9, the shell includes 1 wt % to 16 wt % of the sulfonate-based ionic monomer-derived repeating unit, based on the total weight of the shell, and the shell has a weight average molecular weight of 105,000 g/mol to 645,000 g/mol:

[Formula 1]

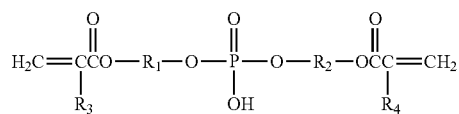

wherein $R_1$ and $R_2$ are each independently an alkylene group having 1 to 30 carbon atoms, and $R_3$ and $R_4$ are each independently hydrogen or a methyl group.

[Formula 2]

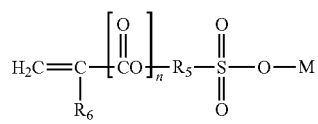

wherein $R_5$ is a single bond or an alkylene group having 1 to 30 carbon atoms, $R_6$ is hydrogen or a methyl group, M is potassium (K), sodium (Na), or hydrogen, and n is 0 or 1.

In other general aspect, there is provided a method for preparing a core-shell copolymer, including: preparing a core by polymerizing a core-forming mixture including a conjugated diene-based monomer and a phosphate-based cross-linking agent represented by Formula 1 above; and preparing a core-shell copolymer by polymerizing a shell-forming mixture including a first alkyl (meth)acrylate monomer, a second alkyl (meth)acrylate monomer, and a sulfonate-based ionic monomer, the sulfonate-based ionic monomer represented by Formula 2 above in the presence of the resulting core to form a shell surrounding the core, wherein the core is 68 parts by weight to 92 parts by weight and the shell is 8 parts by weight to 32 parts by weight, based on 100 parts by weight of the core-shell copolymer, the core has a swell index of 2.7 to 10.9, the shell includes 1 wt % to 16 wt % of the sulfonate-based ionic monomer-derived repeating unit, based on the total weight of the shell, and the shell has a weight average molecular weight of 105,000 g/mol to 645,000 g/mol.

In another general aspect, there is provided a thermoplastic resin composition including the core-shell copolymer and a chlorinated polyvinyl chloride, wherein the thermoplastic resin composition includes 5 parts by weight to 10 parts by weight of the core-shell copolymer, based on 100 parts by weight of the chlorinated polyvinyl chloride.

Advantageous Effects

In the present invention, when the core-shell copolymer is used as an impact modifier, the molded article molded from the thermoplastic resin composition including the core-shell copolymer has improved thermal stability, impact strength, and tensile strength.

Best Mode

The terms and words used in the detailed description and claims should not be interpreted as being limited to conventional or dictionary meanings, but should be interpreted as having meanings and concepts meeting the technical ideas of the present invention based on a principle that the inventors can appropriately define the concepts of terms in order to describe their own inventions in the best mode.

The term "monomer-derived repeating unit" used herein may refer to a monomer-derived component, a structure thereof, or a substance itself. Specific examples thereof may refer to a repeating unit in which the monomer to be added participates in the polymerization reaction and is formed in the polymer, during polymerization of the polymer.

The term "cross-linking agent-derived cross-linking part" used herein may refer to a component derived from compounds used as the cross-linking agent, a structure thereof, or a substance itself, and may refer to a cross-linking part which performs a role of cross-linking in or between polymers formed by the action and reaction of a cross-linking agent.

The term "core" used herein may refer to a polymer component or a copolymer component in which the monomer forming the core is polymerized to form a core or core layer of the core-shell copolymer. The term "shell" used herein may refer to a polymer component or a copolymer component in which the monomer forming the shell is graft polymerized onto the core of the core-shell copolymer to form a shell or shell layer of the core-shell copolymer, where the shell surrounds the core.

Hereinafter, the present invention will be described in more detail to assist in understanding the technical idea of the present invention.

<Core-Shell Copolymer>

The core-shell copolymer according to the present invention may include a core and a shell surrounding the core.

When the core uses the core-shell copolymer including the core as an impact modifier, the core serves to improve thermal stability and impact strength of the molded article molded from the thermoplastic resin composition including the core-shell copolymer.

The core may include a conjugated diene-based monomer-derived repeating unit and a phosphate-based cross-linking agent-derived cross-linking part.

The conjugated diene-based monomer is a main component constituting the core, and may be 1,3-butadiene, 2,3-dimethyl-1,3-butadiene, piperylene, 3-butyl-1,3-octadiene, isoprene, or 2-phenyl-1,3-butadiene.

The content of the conjugated diene-based monomer-derived repeating unit may be 89 wt % to 99.9 wt %, 90 wt % to 99.9 wt %, or 92 wt % to 99.9 wt %, based on the total weight of the core. The molded article molded using the thermoplastic resin composition including the core-shell copolymer according to the present invention as an impact modifier within the above-mentioned range, has excellent thermal stability and impact strength.

The phosphate-based cross-linking agent-derived cross-linking part may be a component for controlling a cross-linking degree of the core and improving thermal stability, and a phosphate-based cross-linking agent may be a compound represented by the following Formula 1:

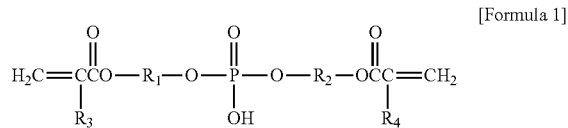

[Formula 1]

wherein $R_1$ and $R_2$ are each independently an alkylene group having 1 to 30 carbon atoms, an alkylene group having 1 to 20 carbon atoms, or an alkylene group having 1 to 8 carbon atoms, and $R_3$ and $R_4$ are each independently hydrogen or a methyl group.

As a specific example, the phosphate-based cross-linking agent may include at least one selected from compounds represented by the following Chemical Formulas 3 and 4:

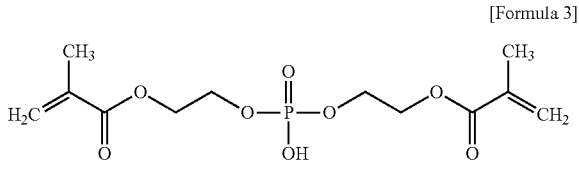

[Formula 3]

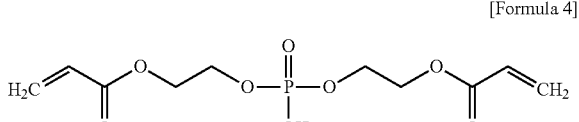

[Formula 4]

The swell index of the core by the phosphate-based cross-linking agent may be 2.7 to 10.9, 3 to 10, or 4 to 10. The molded article molded using the thermoplastic resin composition including the core-shell copolymer according to the present invention as an impact modifier within the above-mentioned range may achieve excellent thermal stability and impact strength. Meanwhile, if the swell index of the core is low, the cross-linking degree of the core may be too high, thereby degrading the impact strength of the molded article due to brittle properties of the rubbery core. In addition, if the swell index of the core is high, the cross-linking degree of the core may be too low to absorb external impact, thereby degrading the impact strength of the molded article.

In general, "swell index" may refer to the degree to which the polymer is swollen by the solvent when the polymer is swollen without being dissolved by the solvent due to cross-linking in or between polymers formed by the action and reaction of the cross-linking agent. Meanwhile, the degree of swelling (swell index) depends on the degree of cross-linking (cross-linking degree) of the polymer, and in general, if the cross-linking degree is high, swelling is poor, that is, the swell index is low.

The swell index may be adjusted by the content of the phosphate-based cross-linking agent, through which the molded article molded using the thermoplastic resin composition including the core-shell copolymer according to the present invention as an impact modifier may achieve excellent thermal stability and impact strength.

In general, the phosphate functional groups are known as functional groups with excellent thermal stability. That is, in the core-shell copolymer of the present invention, when the phosphate-based cross-linking agent is used as the cross-linking agent of the core, the swell index may be adjusted by adjusting the content of the phosphate-based cross-linking agent, and may not only improve the impact strength of the molded article, but also impart thermal stability to the molded article.

The content of the phosphate-based cross-linking agent-derived cross-linking part may be 0.01 wt % to 11 wt %, 0.01 wt % to 9 wt %, or 0.01 wt % to 8 wt %, based on the total weight of the core. The molded article molded using the thermoplastic resin composition including the core-shell copolymer according to the present invention as an impact modifier within the above-mentioned range, has excellent thermal stability and impact strength.

When the core-shell copolymer including the shell is used as an impact modifier, the shell serves to improve thermal stability and processability of the molded article molded from the thermoplastic resin composition including the core-shell copolymer.

The shell may include a first alkyl (meth)acrylate monomer-derived repeating unit, a second alkyl (meth)acrylate monomer-derived repeating unit, and a sulfonate-based ionic monomer-derived repeating unit.

The first alkyl (meth)acrylate monomer is a component that is excellent in compatibility with thermoplastic resins (e.g., chlorinated polyvinyl chlorides) to impart dispersibility of the matrix, and the second alkyl (meth)acrylate monomer is a component that is copolymerized with the first alkyl (meth)acrylate monomer to facilitate the dispersibility of the matrix, both of which may be an alkyl (meth)acrylate monomer containing an alkyl group having 1 to 8 carbon atoms. Here, the alkyl group having 1 to 8 carbon atoms may refer to both a linear alkyl group having 1 to 8 carbon atoms and a branched alkyl group having 3 to 8 carbon atoms. As a specific example, the alkyl (meth)acrylate monomer may be methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, or 2-ethylhexyl (meth)acrylate. Here, the first alkyl (meth)acrylate monomer and the second alkyl (meth)acrylate monomer may refer to alkyl acrylate or alkyl methacrylate, and the first alkyl (meth)acrylate monomer and the second alkyl (meth)acrylate monomer may be different from each other.

As a specific example, the first alkyl (meth)acrylate monomer may refer to alkyl mathacrylate, and the second alkyl (meth)acrylate monomer may refer to alkyl acrylate monomer.

The content of the first alkyl (meth)acrylate monomer-derived repeating unit may be 76 wt % to 94.2 wt %, 79 wt % to 94 wt %, or 85 wt % to 93 wt %, based on the total weight of the shell. The molded article molded using the thermoplastic resin composition including the core-shell copolymer according to the present invention as an impact modifier within the above-mentioned range, has excellent thermal stability and processability.

The content of the second alkyl (meth)acrylate monomer-derived repeating unit may be 4.8 wt % to 8 wt %, 5 wt % to 8 wt %, or 6 wt % to 8 wt %, based on the total weight of the shell. The molded article molded using the thermoplastic resin composition including the core-shell copolymer according to the present invention as an impact modifier within the above-mentioned range, has excellent thermal stability and processability.

The sulfonate-based ionic monomer may be a component for controlling a molecular weight and a glass transition temperature of the shell, and may be a component represented by the following Formula 2:

[Formula 2]

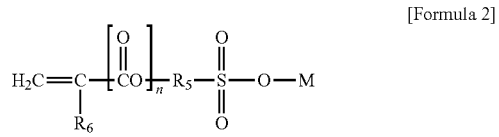

wherein $R_5$ is a single bond, an alkylene group having 1 to 30 carbon atoms, an alkylene group having 1 to 20 carbon atoms, or an alkylene group having 1 to 8 carbon atoms, $R_6$ is hydrogen or a methyl group, M is potassium (K), sodium (Na), or hydrogen, and n is 0 or 1.

As a specific example, the sulfonate-based ionic monomer may include at least one selected from compounds represented by the following Formulas 5 to 8:

[Formula 5]

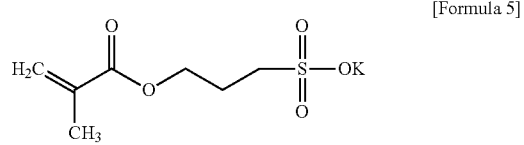

[Formula 6]

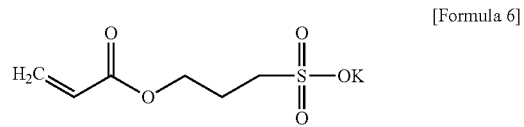

[Formula 7]

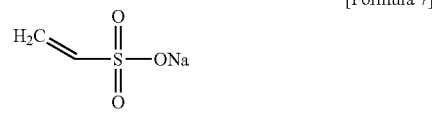

[Formula 8]

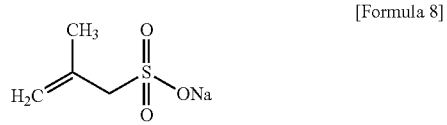

The sulfonate-based ionic monomer may increase the glass transition temperature of the shell containing the sulfonate-based ionic monomer by the ionic bond of sulfonate ions and metal ions between polymers. As such, the glass transition temperature of the shell may be 101° C.

to 135° C., 105° C. to 130° C., or 108° C. to 115° C. The molded article molded using the thermoplastic resin composition including the core-shell copolymer according to the present invention as an impact modifier within the above-mentioned range, has excellent tensile strength and thermal stability.

The content of the sulfonate-based ionic monomer may be 1 wt % to 16 wt %, 1 wt % to 13 wt %, or 1 wt % to 7 wt %, based on the total weight of the shell. The molded article molded using the thermoplastic resin composition including the core-shell copolymer according to the present invention as an impact modifier within the above-mentioned range, has excellent thermal stability and processability. Meanwhile, when the content of the sulfonate-based ionic monomer exceeds the above-mentioned range, ionic clusters are largely formed and thus the glass transition temperature of the shell increased, thereby degrading the processability of the molded article molded using the thermoplastic resin composition including the core-shell copolymer as an impact modifier.

The shell may have a weight average molecular weight of 105,000 g/mol to 645,000 g/mol, 110,000 g/mol to 640,000 g/mol, or 120,000 g/mol to 500,000 g/mol. The molded article molded using the thermoplastic resin composition including the core-shell copolymer according to the present invention as an impact modifier within the above-mentioned range, has excellent mechanical strength (e.g., tensile strength, impact strength, etc.), thermal stability, and processability. Meanwhile, when the shell has a weight average molecular weight of less than 105,000 g/mol, the bonding force between the shell-forming polymer and the matrix may be weak, thereby degrading mechanical strength and thermal stability. In addition, when the shell has a weight average molecular weight of greater than 645,000 g/mol, processability may be degraded due to an increase in processing viscosity.

The weight average molecular weight of the shell may be adjusted by the polymerization temperature, the content of the catalyst, and the content of the molecular weight regulator, and may be reduced as the polymerization temperature is higher, and as the content of the catalyst and the molecular weight regulator is higher.

The core-shell copolymer of the present invention including the core and the shell may include 68 parts by weight to 92 parts by weight, 69 parts by weight to 91 parts by weight, or 70 parts by weight to 90 parts by weight of the core, and 8 parts by weight to 32 parts by weight, 9 parts by weight to 31 parts by weight, or 10 parts by weight to 30 parts by weight of the shell, based on a total of 100 parts by weight of the core-shell copolymer. The molded article molded using the thermoplastic resin composition including the core-shell copolymer according to the present invention as an impact modifier within the above-mentioned range, has excellent thermal stability, impact strength, and tensile strength.

<Method for Preparing Core-Shell Copolymer>

A method for preparing a core-shell copolymer according to the present invention may include preparing a core by polymerizing a core-forming mixture including a conjugated diene-based monomer and a phosphate-based cross-linking agent represented by Formula 1 above; and preparing a core-shell copolymer by polymerizing a shell-forming mixture including a first alkyl (meth)acrylate monomer, a second alkyl (meth)acrylate monomer, and a sulfonate-based ionic monomer, the sulfonate-based ionic monomer represented by Formula 2 above in the presence of the resulting core to form a shell surrounding the core, wherein the core is 68 parts by weight to 92 parts by weight and the shell is 8 parts by weight to 32 parts by weight, based on a total of 100 parts by weight of the core-shell copolymer, the core has a swell index of 2.7 to 10.9, the shell includes 1 wt % to 16 wt % of the sulfonate-based ionic monomer-derived repeating unit, based on the total weight of the shell, and the shell has a weight average molecular weight of 105,000 g/mol to 645,000 g/mol.

The method for preparing the core-shell copolymer may include stepwise preparing the core and the shell by the preparing of the core and the preparing of the core-shell copolymer, respectively, and then polymerizing the core and the shell. The core of the core-shell copolymer may be polymerized by the preparing of the core, and the shell may be then polymerized on the core by the preparing of the core-shell copolymer.

The preparing of the core may preparing the core of the core-shell copolymer, and the type and content of each monomer in the core-forming mixture added in the preparing of the core may be the same as the type and content of each monomer for forming the monomer-derived repeating unit included in the core described above.

In addition, the preparing of the core-shell copolymer may be preparing of the shell of the core-shell copolymer, and the type and content of each monomer in the core-forming mixture added in the preparing of the core-shell copolymer may be the same as the type and content of each monomer for forming each monomer-derived repeating unit included in the shell described above.

The polymerization in the preparing of the core and the preparing of the core-shell copolymer may be performed by using methods such as emulsion polymerization, bulk polymerization, suspension polymerization, and solution polymerization, and may be polymerized further using additives such as initiators, emulsifiers, molecular weight regulators, activators, redox catalysts, and ion exchanged waters.

The initiators may be, for example, but not limited to, inorganic peroxides such as sodium persulfate, potassium persulfate, ammonium persulfate, potassium perphosphate, and hydrogen peroxide; organic peroxides such as t-butyl hydroperoxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, and t-butyl peroxy isobutylrate; nitrogen compounds such as azobis isobutyronitrile, azobis-2,4-dimethylvaleronitrile, azobiscyclohexanecarbonitrile, and azobis metyl isobutyrate. Such initiators may be used in an amount of 0.03 parts by weight to 0.2 parts by weight, based on a total of 100 parts by weight of the core-shell copolymer.

The emulsifiers may be at least one selected from the group consisting of anionic emulsifiers, cationic emulsifiers, and nonionic emulsifiers. The emulsifiers, for example, may be at least one selected from the group consisting of, but not limited to, anionic emulsifiers widely used in emulsifying polymerization, such as sulfonates, carboxylates, succinates, sulfosuccinates and metal salts thereof, for example, alkylbenzenesulfonic acid, sodium alkylbenzene sulfonate, akylsulfonic acid, sodium alkylsulfonate, sodium polyoxyethylene nonylphenylether sulfonate, sodium stearate, sodium dodecyl sulfate, sodium dodecyl benzene sulfonate, sodium lauryl sulfate, sodium dodecyl sulfosuccinate, potassium oleate, and abietinate; cationic emulsifiers in which amine halides, alkyl tetraammonium salts, alkylpyridinium salts, or the like are bonded as functional groups of higher aliphatic hydrocarbons; and nonionic emulsifiers such as polyvinyl alcohol and polyoxyethylene nonylphenyl. Such emulsifiers may be used in an amount of 0.1 parts by weight to 5 parts by weight, based on a total of 100 parts by weight of the core-shell copolymer.

The molecular weight regulators, for example, may be, but not limited to, mercaptans such as a-methylstyrene dimer, t-dodecyl mercaptan, n-dodecyl mercaptan, and octyl mercaptan; halogenated hydrocarbons such as carbon tetrachloride, methylene chloride, and methylene bromide; and sulfur-containing compounds such as tetraethyl thiuram disulfide, dipentamethylene thiuram disulfide, and diisopropylxanthogen disulfide. Such molecular weight regulators may be used in an amount of 0.1 parts by weight to 3 parts by weight, based on a total of 100 parts by weight of the core-shell copolymer.

The activators, for example, may be at least one selected from the group consisting of, but not limited to, sodium hydrosulfite, sodium formaldehyde sulfoxylate, sodium ethylenediamine tetraacetate, ferrous sulfate, lactose, dextrose, sodium linoleate, and sodium sulfate. Such activators may be used in an amount of 0.01 parts by weight to 0.15 parts by weight, based on a total of 100 parts by weight of the core-shell copolymer.

The redox catalysts, for example, may be, but not limited to, sodium formaldehyde sulfoxylate, ferrous sulfate, disodium ethylenediamine tetraacetate, cupric sulfate, or the like. Such redox catalysts may be used in an amount of 0.01 parts by weight to 0.1 parts by weight, based on a total of 100 parts by weight of the core-shell copolymer.

In addition, the core and the core-shell copolymer prepared in the preparing of the core and the preparing of the core-shell copolymer may be obtained in the form of core latex and core-shell copolymer latex in which the core and core-shell copolymer are dispersed in a solvent, respectively. In order to obtain the core-shell copolymer in the form of the powder from the core-shell copolymer, processes such as agglomeration, aging, dehydration and drying may be performed.

<Thermoplastic Resin Composition>

The thermoplastic resin composition according to the present invention may include the core-shell copolymer as an impact modifier, and may include a chlorinated polyvinyl chloride. That is, the thermoplastic resin composition may be a chlorinated polyvinyl chloride composition.

According to an embodiment of the present invention, the chlorinated polyvinyl chloride may mean that the polyvinyl chloride is chlorinated. As a specific example, the chlorinated polyvinyl chloride may mean a polyvinyl chloride whose content of chlorine in the polyvinyl chloride is at least about 10 wt % higher than the content of chlorine contained in the unchlorinated polyvinyl chloride. As a specific example, the chlorinated polyvinyl chloride includes about 66 wt % to about 69 wt % of chlorine in the polyvinyl chloride, and as such, has a high tensile strength and heat deflection temperature because of its high content of chlorine in the resin.

The thermoplastic resin composition may include 5 parts by weight to 10 parts by weight, 5 parts by weight to 9 parts by weight, or 6 parts by weight to 8 parts by weight of the core-shell copolymer, based on 100 parts by weight of the chlorinated polyvinyl chloride. The molded article molded using the thermoplastic resin composition including the core-shell copolymer according to the present invention as an impact modifier within the above-mentioned range, has excellent thermal stability, impact strength, and tensile strength.

The thermoplastic resin composition according to the present invention may further include, in addition to the core-shell copolymer and the chlorinated polyvinyl chloride, additives such as flame retardants, lubricants, antioxidants, light stabilizers, reaction catalysts, mold release agents, pigments, antistatic agents, conductivity imparting agents, EMI shields, magnetizers, cross-linking agents, antibacterial agents, processing aids, metal deactivators, smoke suppressants, fluorine-based anti-drip agents, inorganic fillers, glass fibers, anti-friction agents, anti-wear agents, and coupling agents, within a range in which physical properties are not deteriorated, if necessary.

The methods of melt kneading and processing the thermoplastic resin composition are not particularly limited. However, as an example, the thermoplastic resin composition was first mixed in a supermixer, and then melt kneaded using one of ordinary blending equipments such as a twin screw extruder, a single screw extruder, a roll mill, a kneader, or a Banbury mixer to obtain pellets by using a pelletizer. Thereafter, the resulting pellets may be sufficiently dried with a dehumidifying dryer or a hot air dryer, followed by injection molding to obtain a final molded article.

Hereinafter, the present invention will be described in detail with reference to the following Examples. However, the following Examples describe the present invention by way of example only. It is apparent to those skilled in the art that various changes and modifications can be made in the scope and spirit of the present invention and that the present invention is not limited thereto.

EXAMPLE

Example 1

<Preparation of Core-Shell Copolymer>

Hereinafter, parts by weight are measured based on the total of 100 parts by weight of the core-forming mixture and the shell-forming mixture.

Into nitrogen-substituted polymerization reactor, 65 parts by weight of ion-exchanged water, core-forming mixture containing 79.2 parts by weight of 1,3-butadiene and 0.8 parts by weight of bis [2-(methacryloyloxy)ethyl] phosphate (Formula 3), 0.6 parts by weight of potassium oleate as an emulsifier, and 0.7 parts by weight of sodium hydrogen sulfate were added and stirred. Then, 0.05 parts by weight of diisopropyl hydroperoxide and 0.15 parts by weight of a redox activator prepared with a redox activator composition (0.001 parts by weight of ferrous sulfate, 0.02 parts by weight of ethylenediamine tetraacetic acid, 0.02 parts by weight of sodium formaldehyde sulfoxylate, and 0.02 parts by weight of sodium hydrogen sulfite) was added thereto, and the reaction was performed to a point where polymerization conversion was 30 to 40% at a reaction temperature of 40° C. Thereafter, 5 parts by weight of ion-exchanged water, 1.0 part by weight of potassium oleate, and 0.07 parts by weight of diisopropyl hydroperoxide were further added thereto. The reaction temperature was raised to 65° C. and the reaction proceeded for 20 hours, and was terminated at polymerization conversion of 95% or more to obtain latex containing a core.

Into nitrogen-substituted polymerization reactor, 80 parts by weight (based on solids) of the latex containing the obtained core was added. Thereafter, 10 parts by weight of ion-exchanged water, 0.3 parts by weight of oleic acid as an emulsifier and shell-forming mixture containing 18.0 parts by weight of methyl methacrylate, 1.4 parts by weight of butyl acrylate, and 0.6 parts by weight of 3-sulfopropyl methacrylate potassium salt (Formula 5) were added thereto, and then 0.05 parts by weight of a polymerization initiator, t-butyl hydroperoxide and 0.05 parts by weight of a redox activator prepared with a redox activator composition (0.001 parts by weight of ferrous sulfate, 0.02 parts by weight of ethylenediamine tetraacetic acid, 0.02 parts by weight of sodium formaldehyde sulfoxylate, and 0.02 parts by weight of sodium hydrogen sulfite) were added at once, followed by polymerization for 3 hours to obtain latex containing a core-shell copolymer.

<Preparation of Core-Shell Copolymer Powder>

To 100 parts by weight (based on solids) of the latex containing the obtained core-shell copolymer, 1 part by weight of an aqueous sulfuric acid solution (concentration 5%) as a coagulant was added to coagulate to obtain a slurry. Then, the slurry was washed three times with ion-exchanged water to wash the by-products and filtered to remove the washed water. Subsequently, the resulting slurry was dried at 80° C. for 2 hours using a fluidized-bed dryer to obtain a core-shell copolymer powder.

<Chlorinated Polyvinyl Chloride Composition>

To 100 parts by weight of the chlorinated polyvinyl chloride (HA series, Sekisui), 3.0 parts by weight of tin as a heat stabilizer, 0.3 parts by weight of an antioxidant ($IR_{1010}$), 1.5 parts by weight of a processing aid (PA912), 5 parts by weight of a filler ($CaCO_3$), 2 parts by weight of titanium dioxide, and 0.2 parts by weight of a wax-type lubricant (AC316A) were mixed with 7 parts by weight of the core-shell copolymer powder. Then, the mixture was mixed while raising the temperature to 110° C. using a Henschel mixer to prepare a chlorinated polyvinyl chloride composition.

Example 2

Example 2 was performed in the same manner as in Example 1, except that 1,3-butadiene was added at 78.0 parts by weight instead of 79.2 parts by weight and bis [2-(methacryloyloxy)ethyl] phosphate (Formula 3) was added at 2 parts by weight instead of 0.8 parts by weight in the preparation of the core.

Example 3

Example 3 was performed in the same manner as in Example 1, except that 0.8 parts by weight of bis [2-(acryloyloxy)ethyl] phosphate (Formula 4) was added instead of 0.8 parts by weight of bis [2-(methacryloyloxy) ethyl] phosphate (Formula 3) in the preparation of the core.

Example 4

Example 4 was performed in the same manner as in Example 1, except that 0.6 parts by weight of vinyl sulfonic acid sodium salt (Formula 7) was added instead of 0.6 parts by weight of 3-sulfopropyl methacrylate potassium salt (Formula 5) in the preparation of the core-shell copolymer.

Example 5

Example 5 was performed in the same manner as in Example 1, except that the polymerization temperature was 50° C. instead of 60° C., a polymerization initiator, t-butyl hydroperoxide, was added at 0.01 parts by weight instead of 0.05 parts by weight, and the redox activator was added at 0.01 parts by weight instead of 0.05 parts by weight in the preparation of the core-shell copolymer.

Example 6

Example 6 was performed in the same manner as in Example 1, except that 0.6 parts by weight of 3-sulfopropyl acrylate potassium salt (Formula 6) was added instead of 0.6 parts by weight of 3-sulfopropyl methacrylate potassium salt (Formula 5) in the preparation of the core-shell copolymer.

Example 7

Example 7 was performed in the same manner as in Example 1, except that 0.6 parts by weight of 2-methyl-2-propene-1-sulfonic acid sodium salt (Formula 8) was added instead of 0.6 parts by weight of 3-sulfopropyl methacrylate potassium salt (Formula 5) in the preparation of the core-shell copolymer.

Example 8

Example 8 was performed in the same manner as in Example 1, except that 1,3-butadiene was added at 94.05 parts by weight instead of 79.2 parts by weight and bis [2-(methacryloyloxy)ethyl] phosphate (Formula 3) was added at 0.95 parts by weight instead of 0.8 parts by weight in the preparation of the core; and methyl methacrylate was added at 4.5 parts by weight instead of 18 parts by weight, butyl acrylate was added 0.35 parts by weight instead of 1.4 parts by weight, and 3-sulfopropyl methacrylate potassium salt (Formula 5) was added 0.15 parts by weight instead of 0.6 parts by weight in the preparation of the core-shell copolymer.

Example 9

Example 9 was performed in the same manner as in Example 1, except that 1,3-butadiene was added at 89.1 parts by weight instead of 79.2 parts by weight and bis [2-(methacryloyloxy)ethyl] phosphate (Formula 3) was added at 0.9 parts by weight instead of 0.8 parts by weight in the preparation of the core; and methyl methacrylate was added at 9.0 parts by weight instead of 18 parts by weight, butyl acrylate was added 0.7 parts by weight instead of 1.4 parts by weight, and 3-sulfopropyl methacrylate potassium salt (Formula 5) was added 0.3 parts by weight instead of 0.6 parts by weight in the preparation of the core-shell copolymer.

Example 10

Example 10 was performed in the same manner as in Example 1, except that 1,3-butadiene was added at 73.6 parts by weight instead of 79.2 parts by weight and bis [2-(methacryloyloxy)ethyl] phosphate (Formula 3) was added at 6.4 parts by weight instead of 0.8 parts by weight in the preparation of the core.

Example 11

Example 11 was performed in the same manner as in Example 1, except that 1,3-butadiene was added at 79.99 parts by weight instead of 79.2 parts by weight and bis [2-(methacryloyloxy)ethyl] phosphate (Formula 3) was added at 0.01 parts by weight instead of 0.8 parts by weight in the preparation of the core.

Example 12

Example 12 was performed in the same manner as in Example 1, except that the polymerization temperature was 45° C. instead of 60° C., a polymerization initiator, t-butyl hydroperoxide, was added at 0.005 parts by weight instead of 0.05 parts by weight, and the redox activator was added at 0.005 parts by weight instead of 0.05 parts by weight in the preparation of the core-shell copolymer.

Example 13

Example 13 was performed in the same manner as in Example 1, except that the polymerization temperature was 40° C. instead of 60° C., a polymerization initiator, t-butyl hydroperoxide, was added at 0.0005 parts by weight instead of 0.05 parts by weight, and the redox activator was added at 0.001 parts by weight instead of 0.05 parts by weight in the preparation of the core-shell copolymer.

Comparative Example 1

Comparative Example 1 was performed in the same manner as in Example 1, except that 1,3-butadiene was added at 80.0 parts by weight instead of 79.2 parts by weight and bis [2-(methacryloyloxy)ethyl] phosphate (Formula 3) was not added.

Comparative Example 2

Comparative Example 2 was performed in the same manner as in Example 1, except that butyl acrylate was added at 2.0 parts by weight instead of 1.4 parts by weight and 3-sulfopropyl methacrylate potassium salt (Formula 5) was not added in the preparation of the core-shell copolymer.

Comparative Example 3

Comparative Example 3 was performed in the same manner as in Example 1, except that the polymerization temperature was 80° C. instead of 60° C., a polymerization initiator, t-butyl hydroperoxide, was added at 0.15 parts by weight instead of 0.05 parts by weight, the redox activator was added at 0.15 parts by weight instead of 0.05 parts by weight, and 0.01 parts by weight of a molecular weight regulator, t-dodecyl mercaptan was further added in the preparation of the core-shell copolymer.

Comparative Example 4

Comparative Example 4 was performed in the same manner as in Example 1, except that 1,3-butadiene was added at 59.4 parts by weight instead of 79.2 parts by weight and bis [2-(methacryloyloxy)ethyl] phosphate (Formula 3) was added at 0.6 parts by weight instead of 0.8 parts by weight in the preparation of the core; and methyl methacrylate was added at 36 parts by weight instead of 18 parts by weight, butyl acrylate was added 2.8 parts by weight instead of 1.4 parts by weight, and 3-sulfopropyl methacrylate potassium salt (Formula 5) was added 1.2 parts by weight instead of 0.6 parts by weight within the shell-forming mixture in the preparation of the core-shell copolymer.

Comparative Example 5

Comparative Example 5 was performed in the same manner as in Example 1, except that methyl methacrylate was added at 13.5 parts by weight instead of 18 parts by weight, butyl acrylate was added at 0.5 parts by weight instead of 1.4 parts by weight, and 3-sulfopropyl methacrylate potassium salt (Formula 5) was added at 6.0 parts by weight instead of 0.6 parts by weight in the preparation of the core-shell copolymer.

Comparative Example 6

Comparative Example 6 was performed in the same manner as in Example 1, except that the polymerization temperature was 40° C. instead of 60° C., a polymerization initiator, t-butyl hydroperoxide, was added at 0.001 parts by weight instead of 0.05 parts by weight, and the redox activator was added at 0.002 parts by weight instead of 0.05 parts by weight in the preparation of the core-shell copolymer.

Comparative Example 7

Comparative Example 7 was performed in the same manner as in Example 1, except that 1,3-butadiene was added at 70.4 parts by weight instead of 79.2 parts by weight and bis [2-(methacryloyloxy)ethyl] phosphate (Formula 3) was added at 9.6 parts by weight instead of 0.8 parts by weight in the preparation of the core.

Comparative Example 8

Comparative Example 8 was performed in the same manner as in Example 1, except that 1,3-butadiene was added at 94.05 parts by weight instead of 79.2 parts by weight and bis [2-(methacryloyloxy)ethyl] phosphate (Formula 3) was added at 0.95 parts by weight instead of 0.8 parts by weight in the preparation of the core; and methyl methacrylate was added at 4.5 parts by weight instead of 18 parts by weight, butyl acrylate was added 0.35 parts by weight instead of 1.4 parts by weight, and 3-sulfopropyl methacrylate potassium salt (Formula 5) was added 0.15 parts by weight instead of 0.6 parts by weight in the preparation of the core-shell copolymer.

Comparative Example 9

Comparative Example 9 was performed in the same manner as in Example 1, except that 1,3-butadiene was added at 64.35 parts by weight instead of 79.2 parts by weight and bis [2-(methacryloyloxy)ethyl] phosphate (Formula 3) was added at 0.65 parts by weight instead of 0.8 parts by weight in the preparation of the core; and methyl methacrylate was added at 31.5 parts by weight instead of 18 parts by weight, butyl acrylate was added 2.45 parts by weight instead of 1.4 parts by weight, and 3-sulfopropyl methacrylate potassium salt (Formula 5) was added 1.05 parts by weight instead of 0.6 parts by weight in the preparation of the core-shell copolymer.

Comparative Example 10

Comparative Example 10 was performed in the same manner as in Example 1, except that 1,3-butadiene was added at 79.996 parts by weight instead of 79.2 parts by weight and bis [2-(methacryloyloxy)ethyl] phosphate (Formula 3) was added at 0.004 parts by weight instead of 0.8 parts by weight in the preparation of the core.

Comparative Example 11

Comparative Example 11 was performed in the same manner as in Example 1, except that 1,3-butadiene was added at 68.0 parts by weight instead of 79.2 parts by weight and bis [2-(methacryloyloxy)ethyl] phosphate (Formula 3) was added at 12.0 parts by weight instead of 0.8 parts by weight in the preparation of the core.

Comparative Example 12

Comparative Example 12 was performed in the same manner as in Example 1, except that the polymerization temperature was 70° C. instead of 60° C., a polymerization initiator, t-butyl hydroperoxide, was added at 0.10 parts by weight instead of 0.05 parts by weight, and the redox activator was added at 0.10 parts by weight instead of 0.05 parts by weight in the preparation of the core-shell copolymer.

Experimental Example

Experimental Example 1

The swell index of the core, and the glass transition temperature and the weight average molecular weight of the shell prepared in Examples 1 to 13 and Comparative Examples 1 to 12 were measured by the following methods, and the composition of the core-shell copolymer composition together with the results is shown in Tables 1 and 2 below.

Swell index: After immersing the core (solid content) into toluene for 24 hours, the swell index was obtained by the following Equation: Here, the swell index means that the lower the swell index, the higher the cross-linking degree of the rubber.

Swell index=weight of core swollen in toluene/the core after drying the swollen core to remove toluene  [Equation]

Weight average molecular weight (Mw, g/mol): The sample in powder form was dissolved in a tetrahydrofuran (THF) solvent at a concentration of 0.25 wt % and then the weight average molecular weight was measured using gel permeation chromatography.

Glass transition temperature: The sample in powder form was further dried on a hot air dryer for 30 minutes and then the glass transition temperature was measured using a DSC measuring instrument (Q20 DSC from TA instruments). Here, the rate of temperature rise is 10° C./min.

TABLE 1

| Classification | | Examples | | | | | | |
|---|---|---|---|---|---|---|---|---|
| | | 1 | 2 | 3 | 4 | 5 | 6 | 7 |
| Core | BD (parts by weight) | 79.2 | 78.0 | 79.2 | 79.2 | 79.2 | 79.2 | 79.2 |
| | MEP (parts by weight) | 0.8 | 2 | — | 0.8 | 0.8 | 0.8 | 0.8 |
| | AEP (parts by weight) | — | — | 0.8 | — | — | — | — |
| | Swell index | 7.6 | 6.1 | 7.3 | 7.6 | 7.6 | 7.6 | 7.6 |
| Shell | MMA (parts by weight) | 18.0 | 18.0 | 18.0 | 18.0 | 18.0 | 18.0 | 18.0 |
| | BA (parts by weight) | 1.4 | 1.4 | 1.4 | 1.4 | 1.4 | 1.4 | 1.4 |
| | SMAP (parts by weight) | 0.6 | 0.6 | 0.6 | — | 0.6 | — | — |
| | VSA (parts by weight) | — | — | — | 0.6 | — | — | — |
| | SAP (parts by weight) | — | — | — | — | — | 0.6 | — |
| | MSA (parts by weight) | — | — | — | — | — | — | 0.6 |
| | Glass transition temperature (° C.) | 110 | 111 | 110 | 110 | 110 | 110 | 110 |
| | Weight average molecular weight (g/mol) | 150,000 | 130,000 | 150,000 | 140,000 | 250,000 | 160,000 | 150,000 |
| Chlorinated polyvinyl chloride composition | Chlorinated polyvinyl chloride (parts by weight) | 100 | 100 | 100 | 100 | 100 | 100 | 100 |
| | Core-shell copolymer (parts by weight) | 7 | 7 | 7 | 7 | 7 | 7 | 7 |

| Classification | | Examples | | | | | |
|---|---|---|---|---|---|---|---|
| | | 8 | 9 | 10 | 11 | 12 | 13 |
| Core | BD (parts by weight) | 69.3 | 89.1 | 73.6 | 79.99 | 79.2 | 79.2 |
| | MEP (parts by weight) | 0.7 | 0.9 | 6.4 | 0.01 | 0.8 | 0.8 |
| | AEP (parts by weight) | — | — | — | — | — | — |
| | Swell index | 7.5 | 7.7 | 4.0 | 10.0 | 7.6 | 7.6 |
| Shell | MMA (parts by weight) | 27.0 | 9.0 | 18.0 | 18.0 | 18.0 | 18.0 |
| | BA (parts by weight) | 2.1 | 0.7 | 1.4 | 1.4 | 1.4 | 1.4 |

TABLE 1-continued

|  |  |  |  |  |  |  |  |
|---|---|---|---|---|---|---|---|
|  | SMAP (parts by weight) | 0.9 | 0.3 | 0.6 | 0.6 | 0.6 | 0.6 |
|  | VSA (parts by weight) | — | — | — | — | — | — |
|  | SAP (parts by weight) | — | — | — | — | — | — |
|  | MSA (parts by weight) | — | — | — | — | — | — |
|  | Glass transition temperature (° C.) | 111 | 110 | 110 | 111 | 110 | 111 |
|  | Weight average molecular weight (g/mol) | 230,000 | 120,000 | 150,000 | 140,000 | 350,000 | 500,000 |
| Chlorinated polyvinyl chloride composition | Chlorinated polyvinyl chloride (parts by weight) | 100 | 100 | 100 | 100 | 100 | 100 |
|  | Core-shell copolymer (parts by weight) | 7 | 7 | 7 | 7 | 7 | 7 |

BD: 1,3-butadiene
MEP: bis[(2-methacryloyloxy)ethyl] phosphate
AEP: bis[2-(acryloyloxy)ethyl] phosphate
MMA: methyl methacrylate
BA: butyl acrylate
SMAP: 3-sulfoprolyl methacrylate potassium salt
SAP: 3-sulfoprolyl acrylate potassium salt
MSA: 2-methyl-2-propene-1-sulfonic acid sodium salt
VSA: vinyl sulfonic acid sodium salt

TABLE 2

|  |  | Comparative Examples | | | | | | |
|---|---|---|---|---|---|---|---|---|
|  | Classification | 1 | 2 | 3 | 4 | 5 | 6 | 7 |
| Core | BD (parts by weight) | 80 | 79.2 | 79.2 | 59.4 | 79.2 | 79.2 | 70.4 |
|  | MEP (parts by weight) | 0 | 0.8 | 0.8 | 0.6 | 0.8 | 0.8 | 9.6 |
|  | AEP (parts by weight) | — | — | — | — | — | — | — |
|  | Swell index | 12.0 | 7.6 | 7.6 | 7.7 | 7.6 | 7.6 | 1.2 |
| Shell | MMA (parts by weight) | 18.0 | 18.0 | 18.0 | 36 | 13.5 | 18.0 | 18.0 |
|  | BA (parts by weight) | 1.4 | 2.0 | 1.4 | 2.8 | 0.5 | 1.4 | 1.4 |
|  | SMAP (parts by weight) | 0.6 | 0 | 0.6 | 1.2 | 6.0 | 0.6 | 0.6 |
|  | VSA (parts by weight) | — | — | — | — | — | — | — |
|  | Glass transition temperature (° C.) | 110 | 90 | 110 | 111 | 160 | 110 | 110 |
|  | Weight average molecular weight (g/mol) | 160,000 | 150,000 | 25,000 | 200,000 | 110,000 | 800,000 | 150,000 |
| Chlorinated polyvinyl chloride composition | Chlorinated polyvinyl chloride (parts by weight) | 100 | 100 | 100 | 100 | 100 | 100 | 100 |
|  | Core-shell copolymer (parts by weight) | 7 | 7 | 7 | 7 | 7 | 7 | 7 |

|  |  | Comparative Examples | | | | |
|---|---|---|---|---|---|---|
|  | Classification | 8 | 9 | 10 | 11 | 12 |
| Core | BD (parts by weight) | 94.05 | 64.35 | 79.996 | 68.0 | 79.2 |
|  | MEP (parts by weight) | 0.95 | 0.65 | 0.004 | 12.0 | 0.8 |
|  | AEP (parts by weight) | — | — | — | — | — |
|  | Swell index | 7.7 | 7.4 | 14.0 | 0.5 | 7.6 |
| Shell | MMA (parts by weight) | 4.5 | 31.5 | 18.0 | 18.0 | 18.0 |

TABLE 2-continued

|  |  |  |  |  |  |  |
|---|---|---|---|---|---|---|
|  | BA (parts by weight) | 0.35 | 2.45 | 1.4 | 1.4 | 1.4 |
|  | SMAP (parts by weight) | 0.15 | 1.05 | 0.6 | 0.6 | 0.6 |
|  | VSA (parts by weight) | — | — | — | — | — |
|  | Glass transition temperature (° C.) | 105 | 108 | 110 | 111 | 110 |
|  | Weight average molecular weight (g/mol) | 120,000 | 220,000 | 150,000 | 130,000 | 80,000 |
| Chlorinated polyvinyl chloride composition | Chlorinated polyvinyl chloride (parts by weight) | 100 | 100 | 100 | 100 | 110 |
|  | Core-shell copolymer (parts by weight) | 7 | 7 | 7 | 7 | 7 |

BD: 1,3-butadiene
MEP: bis[(2-methacryloyloxy)ethyl] phosphate
AEP: bis[2-(acryloyloxy)ethyl] phosphate
MMA: methyl methacrylate
BA: butyl acrylate
SMAP: 3-sulfoproplyl methacrylate potassium salt
VSA: vinyl sulfonic acid sodium salt Experimental Example 2

In order to evaluate melting point, impact strength, tensile strength, tensile modulus, processability, and thermal stability of the molded article molded from the chlorinated polyvinyl chloride composition including the core-shell copolymers prepared in Examples 1 to 13 and Comparative Examples 1 to 12 as an impact modifier, a specimen of the chlorinated polyvinyl chloride composition was prepared and evaluated by the following methods. The results are shown in Tables 3 and 4.

Preparation of the specimen: The chlorinated polyvinyl chloride compositions prepared in Examples and Comparative Examples were prepared in pellet form using a single extrusion kneader at 200° C. and 30 rpm, injected into the pellet to prepare a physical property specimen, and then the following physical properties were measured. The results are shown in Tables 3 and 4.

Melt index: The chlorinated polyvinyl chloride compositions prepared in Examples and Comparative Examples were prepared in pellet form using a single extrusion kneader at 200° C. and 30 rpm, and the pellet was weighed out of the cylinder at 200° C. and under a load of 10 kg for 10 minutes using a Toyoseiki Melt Index (F-B01) instrument. Here, excellent melt index means that the melt index is 1 g/10 min to 5 g/10 min.

Izod impact strength: The ¼ inch notched specimen was evaluated by the ASTM D256 test method. In this case, the measurements were all performed in a chamber maintained at room temperature (25° C.). After aging the ¼ inch notched specimen for 6 hours, the specimen was removed and evaluated by the ASTM D256 test method. Here, excellent Izod impact strength means that the Izod impact strength is 6 kgf/cm$^2$ to 10 kgf/cm$^2$.

Tensile strength and tensile modulus (50 mm/min, kg/cm$^2$): In accordance with ASTM D638 method, a ¼" dumbbell-shaped specimen was pinched by a jaw of an Instron tensile strength meter and pulled under a speed of 50 mm/min to measure the load at the time of cutting. Here, excellent tensile strength means that the tensile strength is 45 MPa or more, and excellent tensile modulus means that the tensile modulus is 2,400 MPa or more.

Processability (fusion time): 56 g of the chlorinated polyvinyl chloride composition prepared in Examples and Comparative Examples was initially added at 200° C. and 30 rpm in a Hake mixer, and the time taken for the torque to reach its highest point was measured. Here, excellent fusion time means that the fusion time is 80 seconds or less.

Heat deflection temperature: In order to confirm the thermal stability, the heat deflection temperature was measured under a load of 18.6 kg using a specimen of thickness ¼ by ASTM D648 test method. Here, excellent heat deflection temperature means that the heat deflection temperature is 100° C. to 120° C.

TABLE 3

| Classification | Examples | | | | | | | | | | | | |
|---|---|---|---|---|---|---|---|---|---|---|---|---|---|
|  | 1 | 2 | 3 | 4 | 5 | 6 | 7 | 8 | 9 | 10 | 11 | 12 | 13 |
| Melt index (g/10 min) | 3.2 | 3.3 | 3.3 | 3.2 | 2.6 | 3.3 | 3.2 | 3.7 | 3.0 | 3.4 | 3.0 | 2.7 | 2.4 |
| Impact strength (kgf/cm$^2$) | 8 | 7.6 | 7.8 | 7.9 | 8.5 | 8.1 | 7.9 | 7.0 | 8.7 | 6.7 | 6.5 | 7.5 | 8.3 |
| Tensile strength (MPa) | 50 | 53 | 51 | 54 | 51 | 51 | 52 | 54 | 52 | 56 | 51 | 53 | 55 |
| Tensile modulus (MPa) | 2450 | 2470 | 2456 | 2480 | 2490 | 2460 | 2455 | 2500 | 2420 | 2498 | 2460 | 2448 | 2456 |
| Processability (sec) | 65 | 62 | 63 | 68 | 74 | 66 | 64 | 75 | 60 | 69 | 61 | 72 | 75 |

TABLE 3-continued

| Classification | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Heat defection temperature (° C.) | 110 | 111 | 112 | 113 | 113 | 110 | 111 | 112 | 109 | 111 | 111 | 112 | 112 |

TABLE 4

| Classification | Comparative Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Melt index (g/10 min) | 3.1 | 3.0 | 6.0 | 2.8 | 3.4 | 0.5 | 2.9 | 0.5 | 3.1 | 0.4 | 3.2 | 2.5 |
| Impact strength (kgf/cm$^2$) | 4 | 8.1 | 5 | 4 | 2 | 8 | 1.1 | 5 | 3.9 | 3.5 | 1.5 | 5.5 |
| Tensile strength (MPa) | 40 | 39 | 38 | 53 | 60 | 46 | 45 | 35 | 56 | 32 | 52 | 45 |
| Tensile modulus (MPa) | 2300 | 2310 | 2444 | 2467 | 2600 | 2500 | 2510 | 2300 | 2510 | 2310 | 2410 | 2380 |
| Processability (sec) | 70 | 68 | 67 | 98 | 120 | 90 | 78 | 65 | 90 | 68 | 45 | 70 |
| Heat defection temperature (° C.) | 95 | 94 | 98 | 112 | 125 | 111 | 120 | 95 | 110 | 96 | 110 | 110 |

As shown in Tables 3 and 4, it was confirmed that in the core-shell copolymer according to the present invention, since the core includes a phosphate-based cross-linking agent-derived cross-linking part, excellent impact strength and thermal stability were obtained by controlling the cross-linking degree of the core, and since the shell includes a sulfonate-based ionic monomer, excellent thermal stability and processability were obtained by controlling the glass transition temperature and the weight average molecular weight of the shell.

Meanwhile, it was confirmed that for Comparative Example 1 in which no core includes the phosphate-based cross-linking agent-derived cross-linking part, various physical properties such as impact strength, tensile strength, and thermal stability, excluding processability, were degraded.

In addition, it could be confirmed that for Comparative Example 7 in which the content of the phosphate-based cross-linking agent included in the core exceeds 10 wt %, the cross-linking degree of the core was too high, which leads to a low swell index, and the impact strength was degraded due to brittle properties of the rubber forming the core.

In addition, it could be confirmed that for Comparative Example 2 in which no shell includes the sulfonate-based ionic monomer-derived repeating unit, tensile strength, tensile modulus, and thermal stability were degraded.

In addition, it could be confirmed that for Comparative Examples 3 and 12 in which the shell has a weight average molecular weight of less than 100,000 g/mol, impact strength, tensile strength, thermal stability, or the like were degraded; and for Comparative Example 6 in which the shell has a weight average molecular weight of more than 500,000 g/mol, processability was degraded.

Further, it could be confirmed that for Comparative Examples 4 and 9 in which the content of the core is less than 70 parts by weight, based on a total of 100 parts by weight of the core-shell copolymer, impact strength and processability were degraded, and for Comparative Example 8 in which the content of the core is more than 90 parts by weight, based on a total of 100 parts by weight of the core-shell copolymer, various physical properties such as impact strength, tensile strength, and thermal stability, excluding processability, were degraded.

Furthermore, it could be confirmed that for Comparative Examples 10 and 11 in which the swell index of the core deviates from 3.7 to 10, impact strength was degraded.

In addition, it could be confirmed that for Comparative Example 5 in which the content of the sulfonate-based ionic monomer-derived repeating unit included in the shell exceeds 20 wt %, impact strength, processability, and thermal stability were degraded.

The invention claimed is:

1. A core-shell copolymer, comprising:
   a core; and
   a shell surrounding the core,
   wherein the core includes a conjugated diene-based monomer-derived repeating unit and a phosphate-based cross-linking agent-derived cross-linking part, the phosphate-based cross-linking agent represented by the following Formula 1,
   wherein the shell includes a first alkyl (meth)acrylate monomer-derived repeating unit, a second alkyl (meth) acrylate monomer-derived repeating unit, and a sulfonate-based ionic monomer-derived repeating unit, the sulfonate-based ionic monomer represented by the following Formula 2,
   wherein the core is 68 parts by weight to 92 parts by weight and the shell is 8 parts by weight to 32 parts by weight, based on a total of 100 parts by weight of the core-shell copolymer,
   wherein the core has a swell index of 2.7 to 10.9, wherein the shell includes 1 weight percent (wt %) to 16 wt % of the sulfonate-based ionic monomer-derived repeating unit, based on the total weight of the shell, and wherein the shell has a weight average molecular weight of 105,000 g/mol to 645,000 g/mol:

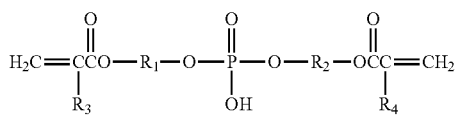

[Formula 1]

wherein $R_1$ and $R_2$ are each independently an alkylene group having 1 to 30 carbon atoms, and $R_3$ and $R_4$ are each independently hydrogen or a methyl group, and

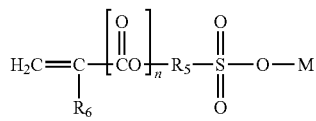

[Formula 2]

wherein $R_5$ is a single bond or an alkylene group having 1 to 30 carbon atoms, $R_6$ is hydrogen or a methyl group, M is potassium (K), sodium (Na), or hydrogen, and n is 0 or 1, wherein the swell index of the core is measured by immersing the core into toluene for 24 hours, and obtained by the following equation:

swell index=weight of the core swollen in toluene/ weight of the core after drying the swollen core to remove toluene.

2. The core-shell copolymer of claim 1, wherein the phosphate-based cross-linking agent includes at least one phosphate-based cross-linking agent represented by the following Formulas 3 and 4:

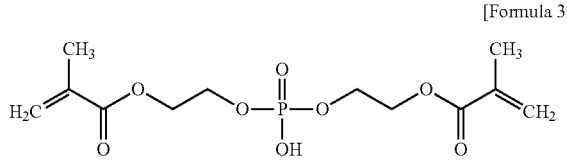

[Formula 3]

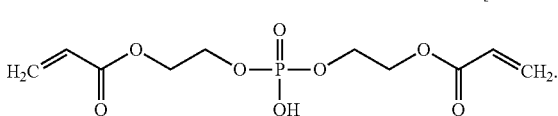

[Formula 4]

3. The core-shell copolymer of claim 1, wherein the core has the swell index of 4 to 10.

4. The core-shell copolymer of claim 1, wherein the core includes 89 wt % to 99.0 wt % of the conjugated diene-based monomer-derived repeating unit and 0.01 wt % to 11 wt % of the phosphate-based cross-linking agent-derived cross-linking part.

5. The core-shell copolymer of claim 1, wherein the sulfonate-based ionic monomer includes at least one sulfonate-based ionic monomer represented by the following Formulas 5 to 8:

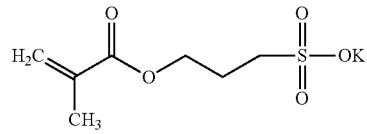

[Formula 5]

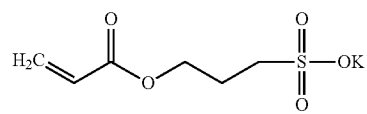

[Formula 6]

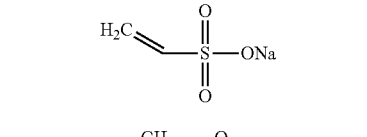

[Formula 7]

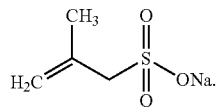

[Formula 8]

6. The core-shell copolymer of claim 1, wherein the shell has a weight average molecular weight of 120,000 g/mol to 500,000 g/mol.

7. The core-shell copolymer of claim 1, wherein the shell has a glass transition temperature of 101° C. to 135° C., wherein the glass transition temperature of the shell is measured by using a DSC measuring instrument with a rate of temperature rise of 10° C./min on the shell in powder form after drying on a hot air dryer for 30 minutes.

8. The core-shell copolymer of claim 1, wherein the shell includes 76 wt % to 94.2 wt % of the first alkyl (meth) acrylate monomer-derived repeating unit, 4.8 wt % to 8 wt % of the second alkyl (meth)acrylate monomer-derived repeating unit, and 1 wt % to 16 wt % of the sulfonate-based ionic monomer-derived repeating unit.

9. A thermoplastic resin composition, comprising:

the core-shell copolymer of claim 1 and a chlorinated polyvinyl chloride, wherein the thermoplastic resin composition includes 5 parts by weight to 10 parts by weight of the core-shell copolymer, based on 100 parts by weight of the chlorinated polyvinyl chloride.

10. A method for preparing a core-shell copolymer, the method comprising:

polymerizing a core-forming mixture to prepare a core, the core-forming mixture including a conjugated diene-based monomer and a phosphate-based cross-linking agent represented by the following Formula 1; and polymerizing a shell-forming mixture in the presence of the core to prepare a shell of a core-shell copolymer, the shell-forming mixture including a first alkyl (meth) acrylate monomer, a second alkyl (meth)acrylate monomer, and a sulfonate-based ionic monomer represented by the following Formula 2, wherein the core is 68 parts by weight to 92 parts by weight and the shell is 8 parts by weight to 32 parts by weight, based on a total of 100 parts by weight of the core-shell copolymer, wherein the core has a swell index of 2.7 to 10.9, wherein the shell includes 1 wt % to 16 wt % of a sulfonate-based ionic monomer-derived repeating unit, and wherein the shell has a weight average molecular weight of 105,000 g/mol to 645,000 g/mol:

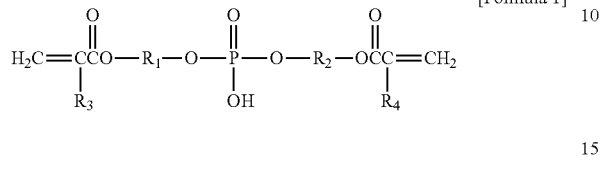

[Formula 1]

wherein $R_1$ and $R_2$ are each independently an alkylene group having 1 to 30 carbon atoms, and $R_3$ and $R_4$ are each independently hydrogen or a methyl group, and

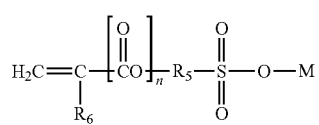

[Formula 2]

wherein $R_5$ is a single bond or an alkylene group having 1 to 30 carbon atoms, $R_6$ is hydrogen or a methyl group, M is potassium (K), sodium (Na), or hydrogen, and n is 0 or 1, wherein the swell index of the core is measured by immersing the core into toluene for 24 hours, and obtained by the following equation:

swell index=weight of the core swollen in toluene/ weight of the core after drying the swollen core to remove toluene.

* * * * *